(12) United States Patent
Tsai et al.

(10) Patent No.: US 6,498,583 B1
(45) Date of Patent: Dec. 24, 2002

(54) REAL TIME MULTIPLE SIMULATED TARGETS GENERATOR FOR MONO PULSE RADAR

(75) Inventors: Ming-Fa Tsai, Taipei Hsien (TW); Chao-Cheng Chou, Hsinchu Hsien (TW); Ming-Chan Chen, Hsinchu (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/034,863

(22) Filed: Dec. 27, 2001

(51) Int. Cl.[7] .............................. G01S 7/40; G09B 9/00
(52) U.S. Cl. ..................................................... 342/169
(58) Field of Search ................................. 342/169, 171, 342/172, 194, 195; 434/2, 3, 4, 5

(56) References Cited

U.S. PATENT DOCUMENTS

| | | | | |
|---|---|---|---|---|
| 3,171,880 A | * | 3/1965 | Feinberg ........................ 434/2 |
| 3,665,616 A | * | 5/1972 | Basard et al. ................ 342/171 |
| 3,982,244 A | * | 9/1976 | Ward et al. .................. 342/149 |
| 4,138,678 A | * | 2/1979 | Kirner ......................... 342/169 |
| 4,730,191 A | * | 3/1988 | Groebke ...................... 342/169 |
| 5,341,146 A | * | 8/1994 | Vennum et al. ................ 342/13 |
| 5,457,463 A | * | 10/1995 | Vencel et al. ............... 342/169 |
| 6,075,480 A | * | 6/2000 | Deliberis, Jr. ............... 342/169 |
| 6,384,771 B1 | * | 5/2002 | Montague et al. ........... 342/165 |

* cited by examiner

Primary Examiner—Thomas H. Tarcza
Assistant Examiner—Brian Andrea
(74) Attorney, Agent, or Firm—J.C. Patents

(57) ABSTRACT

A real time multiple simulated targets generator for mono pulse radar, applied to a simulation control system of a radar system, having at least one signal processor, in which a real time multiple targets generator is built inside. The real time multiple target generator has a precision timing generator to generate a timing signal. Several PRN code generators receive the timing signal to generate the psendo random code. Several DMWG's which are connected to the PTG and the PRN code generators to generate the modulated waveforms. The extent target generators are coupled to the corresponding DMWG's to receive the modulated waveform signals and generate simulated target signals.

30 Claims, 11 Drawing Sheets

REAL TIME MULTIPLE SIMULATED TARGETS GENERATOR FOR MONO PULSE RADAR

SCENARIO OF THE INVENTION

1. Field of the Invention

The invention relates in general to a real time target generator, and more particularly, to a real time multiple simulated targets generator.

2. Description of the Related Art

For a missile projection control system, scenarios of the war games are difficult to design and costly. To effectively test the capability of electronic interference suppression, clutter elimination, signal/noise (S/N) ratio gain, and target extracted algorithm of the radar signal processor (SP) of a projection control system; and the effectiveness of a dynamic real time schedule of radar control computer (RCC) responsible for data processing and the search and tracking algorithm, radar multiple simulated targets and scenario generators are required to generate the simulated received waveform, so as to reduce the requirement of the war games.

The conventional simulator employing an independent strap-on system requires synchronous signal and interface to match the system to be measured. Such a simulator has to be made by custom design, and is thus very costly. Moreover, part of the specifications of the system to be measured, such as the waveform modulation method and maximum compression gain, relates the confidentiality of system specification. By using the analog technique, the conventional simulator has a large volume and a blind distance limitation region generated by the simulated target.

SUMMARY OF THE INVENTION

The invention provides a real time multiple simulated targets generator for mono pulse radar. The real time multiple simulated targets generator for mono pulse radar has variable modulation waveform to simulate any radar feedback signal and the versatile scenario in a reduced hardware cost.

The invention provides a real time multiple simulated targets generator for mono pulse radar, which can be applied to a simulation control system of a radar system. The real time multiple simulated targets generator for mono pulse radar comprises at least one signal processor, in which a real time multiple simulated targets generator is built. The real time multiple simulated targets generator comprises a precision timing generator, N (N is an integer greater than or equal to 1) pseudo random noise (PRN) code generators, N digital modulation waveform generators (DMWG), and N extent target generators. Each of the pseudo random noise code generators is coupled to the precision timing generator to receive a timing signal generated thereby, so as to generate a pseudo random noise code. Each of the digital modulation waveform generators is coupled to the precision timing generator to receive the timing signal and coupled to the corresponding pseudo random noise code generator to receive the pseudo random noise code thereof, so as to generate a modulation waveform signal. Each of the extent target generators is coupled to the corresponding digital modulation waveform generator to receive the modulation waveform signal thereof, so as to generate a simulation target signal.

The above precision timing generator further comprises an input register, a time word RAM, an event code RAM, a control FIFO, an address counter, a loop down counter, a reference counter, a comparator, and an output register. The input register receives a data from an external device or circuit. The time word RAM is coupled to the input register to store a plurality of time words. The event code RAM is coupled to the input register to provide at least one start address and a loop count value. The address counter is coupled to the time word RAM, the event code RAM and the control FIFO to address a time word and an event code corresponding to the start address. The loop down counter is coupled to the control FIFO to count down the loop count value. The reference counter is used to provide a time reference count value. The comparator is coupled to the time word RAM and the reference counter to compare the reference count value with the time word values output by the time word RAM, and outputs a time complete signal when the reference count value equals to the time word value. The output register is coupled to the event code RAM and the comparator to output the event code output from the event code RAM while receiving the time complete signal.

The above pseudo random noise code generator further comprises a first register, a second register, a bandwidth selector, a shift register, a counter, a stop signal generator, a multiplexer, an AND gate and a NOR gate. The first register receives a phase seed word (PC) parameter, and the second register receives a phase feedback word (PF) parameter. The bandwidth selector is used to receive a plurality of bandwidth clocks and select a corresponding bandwidth clock signal to output. The shift register is coupled to the first register and the bandwidth selector to receive the PC parameter and the bandwidth clock signal, so as to generate a psendo random sequence. The counter outputs a trigger signal according to a code length. The stop signal generator is coupled to the counter to generate a stop signal according to the trigger signal. The multiplexer is coupled to the shift register to sequentially output each bit of the pseudo random noise code sequence, and is further coupled to the stop signal generator. The output is stopped when the multiplexer receives the stop signal. The AND gate is used to receive the pseudo random noise code sequence and the PF parameter output from the shift register and the second register, respectively. The NOR gate is coupled to an output of the AND gate to feedback the output thereof to the shift register.

The above digital modulation waveform generator further comprises a parameter FIFO, a linear frequency generator, a phase generator, a 2's-complementor, a COS/SIN value generator, a multiplixer, a pre-pulse generator, a complex multiplier, and an select/output apparatus. The parameter FIFO receives a data signal. The linear frequency generator is coupled to an output of the parameter FIFO to generate a linear frequency. The phase generator is coupled to the parameter FIFO and the linear frequency generator to generate a phase according to the pseudo random noise code. The COS/SIN value generator is coupled to an output of the phase generator. The multiplexer receives the data signal, an output of the 2's-complementor, and an output of the COS/SIN value generator. The pre-pulse generator is used to synchronize the analog module. The complex multiplier receives an output of the multiplexer. The select/output apparatus receives outputs of the pre-pulse generator, the complex multiplier and the COS/SIN value generator, and select one of them to output.

The extent target generator further comprises a plurality of programmable digital delayers, a plurality of AND gates and a summation apparatus. The programmable digital delayers are serially connected to each other. The output of each programmable digital delayer is connect to an input of the next programmable digital delay, while the input of the first programmable digital delayer is coupled to the output signal of the digital modulation waveform generator. The AND gate receives the output signal of each programmable digital delay. The summation apparatus is coupled to the output of each AND gate and the output signal of the digital modulation waveform generator to obtain a summation thereof, so as to generate the simulation target signal.

Both the foregoing general description and the following detailed description are exemplary and explanatory only and are not restrictive of the invention, as claimed.

DESCRIPTION OF THE PREFERRED EMBODIMENTS

Figure 1A:
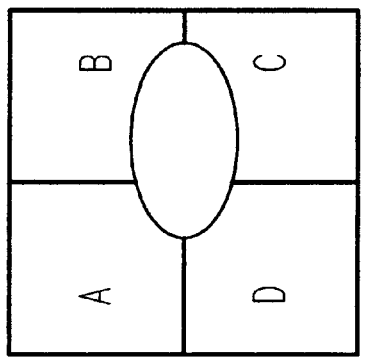
FIG. 1A to FIG. 1D shows the schematic deviation of the sum channel, the α channel, and β channel with respect to the radar antenna axis.

The mono pulse radar is a pulse radiation tracking method that emits a single pulse and derives the azimuth and elevation angular track errors. The mono pulse radar can avoid the error caused by movement of the target during sequential lobing. The immunity for jammer interference is also promising. However, it has to provide the receiving circuit for difference channel.

The real time multiple simulated targets generator simulates and generates the feedback receiving signals of the sum channel, the α channel and the β channel and is built in a waveform generator of the radar system. The sum channel uses the search and track mode to provide the simulation feedback signal of distance, size and Doppler frequency of the target. The signals of the α channel and the β channel employ in the tracking mode to provide the simulation feedback signal of azimuth and elevation angular tracking errors.

We use the sum channel as a self reference to generate the simulated α and β channel signals. The sign digit indicates the orientation of the tracking error toward the left, right, up or down. When the sign digits of the α channel and the β channel signals are positive, the phase difference from the sum self reference is 0°. When the sign digits of the α channel and the β channel signals are negative, the phase difference from the sum self reference is 180°.

The typical mono radar waveform modulation method includes linear frequency modulation (LFM) and pseudo random noise code modulation. Assuming that there are N Doppler frequencies as the simulation targets of $f_{di}$, the radiation return waveform at the sum channel can be presented by the following formula by using LFM modulation and PRN modulation.

$$sum(t) = \sum_{i=1}^{N} A_i e^{j(2\pi \cdot (f_i(t) \pm f_{di})(t-t_i)) + \theta_i + prn_i(kt-t_i)\cdot \pi)}$$

$A_i$ is the magnitude of the return simulated target, $f_i(t)=S_i t + f_0$, and $S_i$ is the frequency slope of LFM modulation waveform, while $S_i$ is $0$ for PRN modulation. Further, $f_0$, is the start frequency of LFM modulation and the digital fundamental frequency of PRN modulation $f_{di}$ is the Doppler frequency drift of the simulated target, and $t_i$ is the timing when the simulated target appears, of which the ranges is from $0$ to pulse repeat interval (PRI). The term $prn_i(kt-t_i)$ is the pseudo random noise code sequence, where k is the bandwidth.

Similarly, the feedback signals of the α channel and β channel can be presented as:

$$\alpha(t) = \sum_{i=1}^{N} \alpha_i A_i e^{j(2\pi \cdot (f_i(t) \pm f_{di})(t-t_i)) + \theta_i + prn_i(kt-t_i)\cdot \pi + dira_i \cdot \pi)}$$

$$\beta(t) = \sum_{i=1}^{N} \beta_i A_i e^{j(2\pi \cdot (f_i(t) \pm f_{di})(t-t_i)) + \theta_i + prn_i(kt-t_i)\cdot \pi + dirb_i \cdot \pi)}$$

where $\alpha_i$ is the adjusting coefficient for the azimuth angular error, $\beta_i$ is the adjusting coefficient for the elevation angular error, $dira_i$ is the azimuth angular error direction related to the sum channel, and $dirb_i$ is the elevation angular error direction related to the sum channel.

FIGS. 1A to 1D show the errors of sum channel, α channel and β channel with respect to the radar antenna beam axis. As shown in FIGS. 1A to 1D, the whole target above the antenna is divided into four areas A, B, C and D. The above sum channel, a channel and β channel can be presented by:

sum=A+B+C+D

α channel=(A+D)−(B+D) (azimuth error)

β channel=(A+B)−(C+D) (elevation error)

Figure 1B:
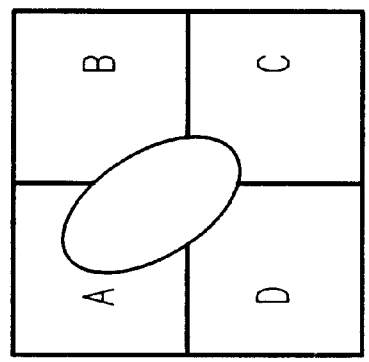
Figure 1C:
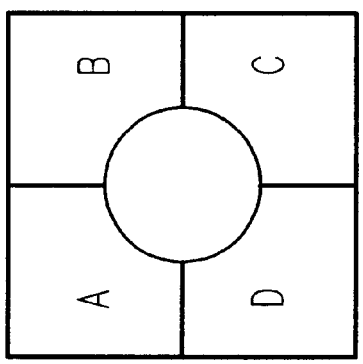
Figure 1D:
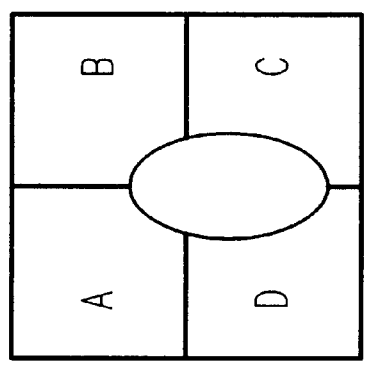

Therefore, the sign digit of the α channel and β channel can be used to determine the direction toward which the target is deviated from the antenna axis, or the target is located right on the antenna axis. For example, FIG. 1A shows the target right located on the antenna axis. FIG. 1B shows that the target is on the right hand side of the antenna axis. FIG. 1C shows the target located above the antenna axis. FIG. 1D shows the target deviated to the right lower part of the antenna axis.

Figure 2:
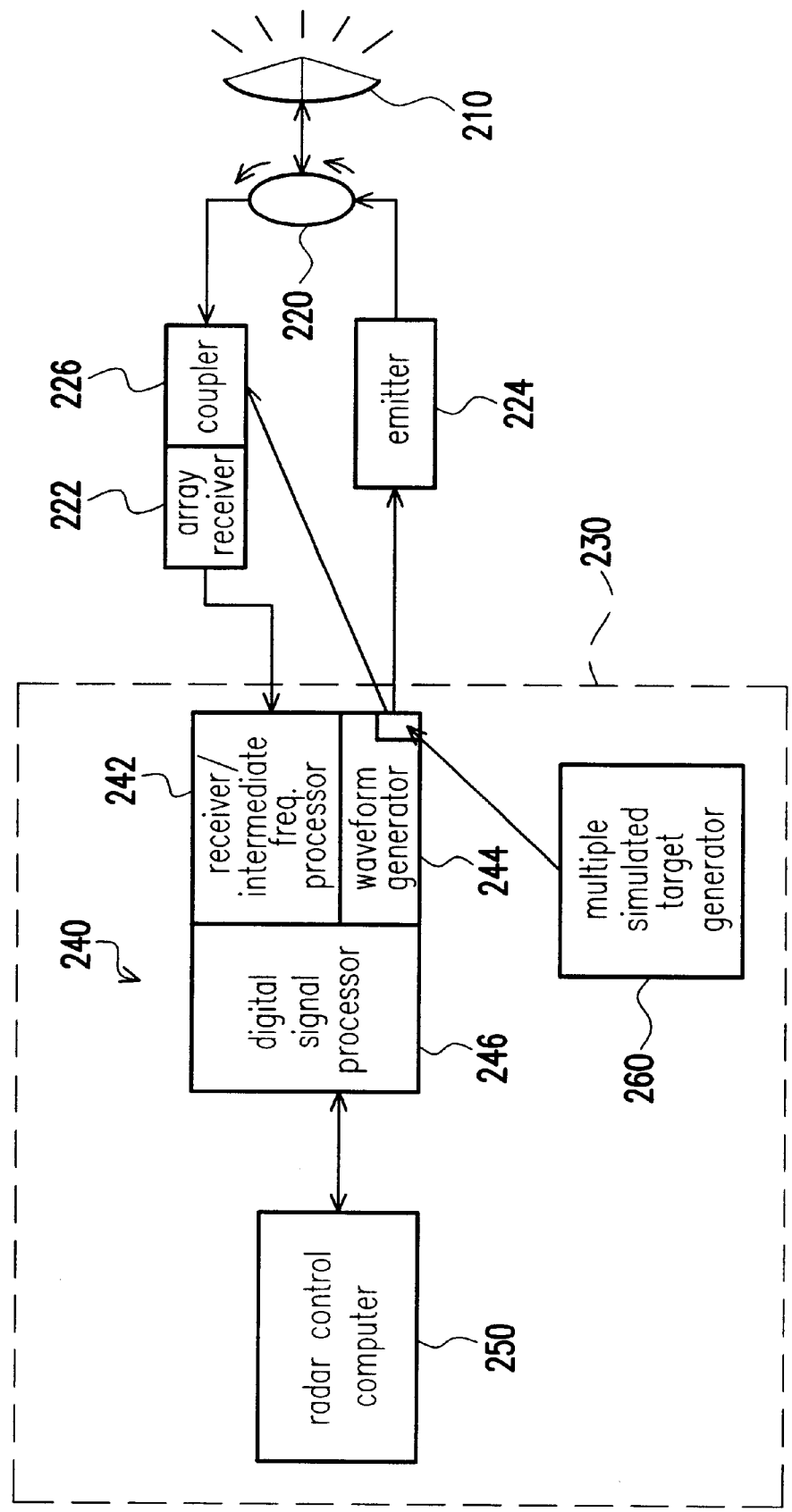
FIG. 2 shows a radar system employing the real time multiple simulated targets generator for mono pulse radar provided by the invention.

FIG. 2 shows the radar system employing the real time multiple simulated targets generator for mono pulse radar according to the invention. The radar system comprises a radar array antenna, a circulator 220, an on array receiver 222, an emitter, a coupler 226 and a radar signal control and process module 230. The radar signal control and process module 230 further comprises a signal processor 240 and a radar control computer 250. Generally speaking, the signal processor further comprises a receiver/intermediate frequency processor (receiver/IFP) 242, a waveform generator 244 and a digital signal processor (DSP) 246. The above radar system structure is a basic structure and has the connection structure as shown in FIG. 2. The detailed description is not provided here for it is not the essential subject matter of the present invention.

The key point of the invention is that the multiple simulated targets generator 260 is built in the waveform generator 244. Using the time division technique, the radar control computer (RCC) 250 can schedule the simulation target scenario, perform the normal search or track dwell, process the target report simultaneously. To allow one to further understand the technique of the invention, the multiple simulated targets generator 260 is described in details as follows. The operation, variation and interface connection of other parts can be properly modified without exceeding the scope of the present invention.

In FIG. 2, the multiple simulated targets generator 260 is built in the signal processor 244. The scenario of the multiple simulated targets generator 260 (such as the noise and interference sources) and the characteristics of the simulated targets (such as the distance, position, azimuth and elevated angles, speed, acceleration, flying angle and turning rate of the noses) are configured by the interface between the operator and equipment of the radar control computer 250 of the radar system. The related process and dwell scheduling are also controlled by it are also commenced. The radar control computer 250 then transmits the data of the above scenario and target characteristic to the signal processor 240 in a stimulus form via the hardware interface. The stimulus is then decoded into a parameter by the control processor inside the signal processor 240 and transmitted to the multiple simulated targets generator 260. To accelerate the process, the dwell pipeline structure is adopted to fit the real time requirement. The multiple simulated targets generator 260 in the system has a target simulation operation mode and a tactical radiation operation mode. An instant conversion between these two modes can be achieved by time sharing between two radar dwell processes.

In the target simulation mode, the simulated target signal generated by the multiple simulated targets generator 260 is radiated from the emitter 224. Instead, we generate the simulated return waveform received from the antenna and inject it to the direction coupler 226 in front of the array receiver 222, and then transmitted to the receiver/intermediate frequency processor 242 of the signal processor 240 for self error detection test or system performance test or RADAR operation training thereof. In the tactical radiation mode, the waveform of a signal generated by one digital modulation waveform generator of the multiple simulated targets generator 260 (other generators are turned off) is modulated and transmitted to the emitter 224 for power amplification. The modulated and amplified signal is then emitted to the specific space dominated by the antenna 210.

Figure 3:
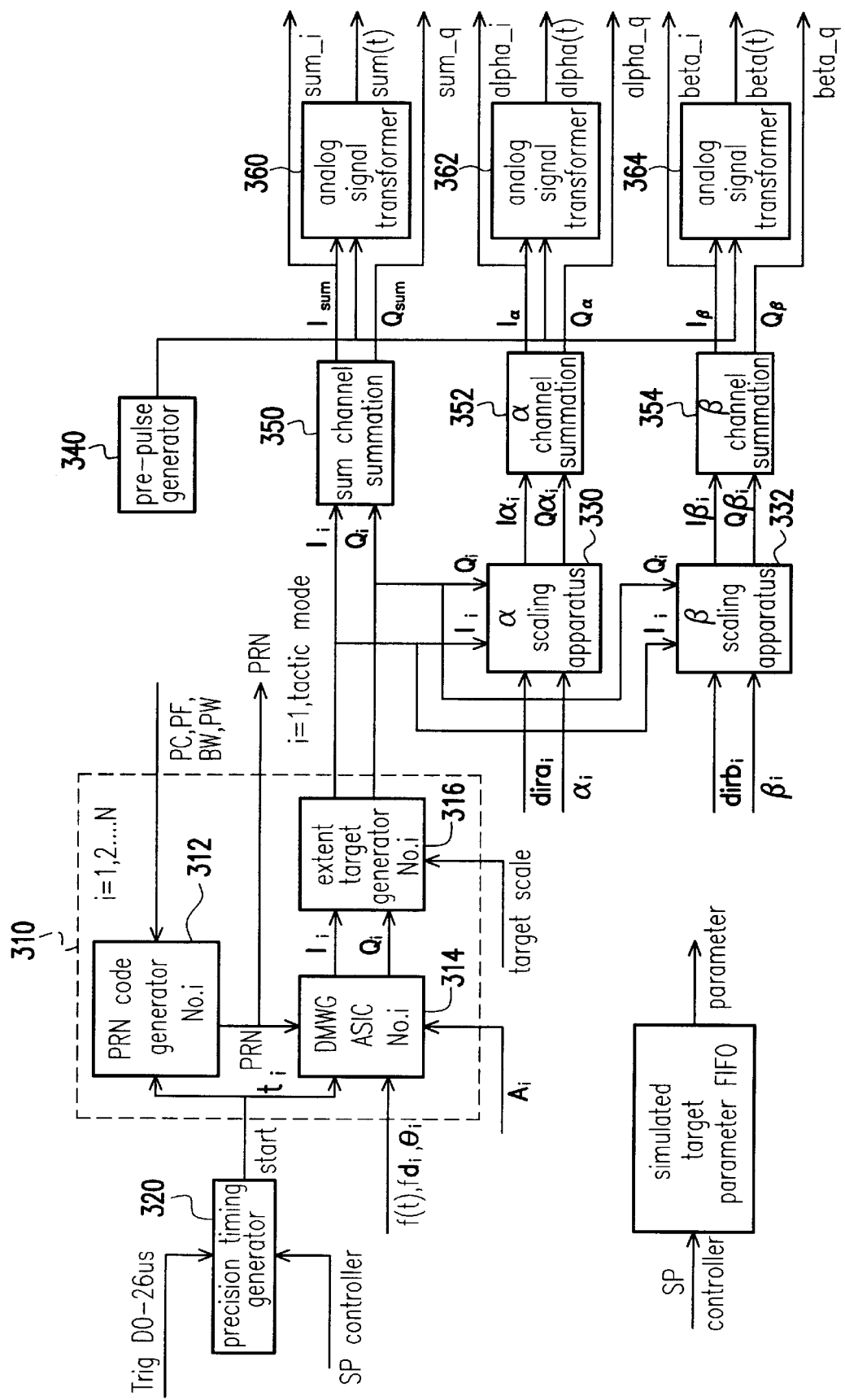
FIG. 3 shows a structure of the multiple simulated targets generator.

The structure of the multiple simulated targets generator is introduced as follows. FIG. 3 shows the structure of a multiple simulated targets generator and various functional module blocks. The multiple simulated targets generator is encircled by the dash line.

In FIG. 3, the multiple simulated targets generator 260 comprises a simulated parameter FIFO, a precision timing generator (PTG) 320, a pseudo random noise code generator 312, a digital modulation waveform generator 314, an extent target generator 316, an $\alpha$ channel out of phase processing and scaling apparatus 330, a $\beta$ channel out of phase processing and scaling apparatus 332, a pre-pulse generator 340 a sum channel summation apparatus 350, an $\alpha$ channel summation apparatus 352, a $\beta$ channel summation apparatus 352, and analog signal transformers 360/362/364. The above pseudo random noise code generator 312, the digital modulation waveform generator 314 and the extent target generator 316 are the major components of the multiple simulated targets generator 316. Therefore, these three components are grouped into a set (module 310), while more than one module 310 may be required according to specific requirement. In FIG. 3, only one set of module 310 is illustrated as an example for description.

The precision timing generator 320 generates a precision timing signal to the pseudo random noise code generator 312 and the digital modulation waveform generator 314 of the module 310. As shown in FIG. 3, the pseudo random noise code generator 312 generates the pseudo random code required for modulation to the digital modulation waveform generator 314 according to the pulse seed word (PC), the pulse feedback word (PF), the bandwidth (BW) and the pulse width (PW). The digital modulation waveform generator 314 receives external parameters $A_i$, $f(t)$, $f_{di}$ and $\theta_i$ to synthesize the digital modulation of waveform, and output signals $I_i$ and $Q_i$ to the extent target generator 316. After performing extending of target scale according to the input target scale, the extent target generator 316 outputs the signals $I_i$ and $Q_i$.

The signals $I_i$ and $Q_i$ output by the extent target generator 316 are then transmitted to the $\alpha$ out of phase processing and scaling apparatus 330, $\beta$ out of phase processing and scaling apparatus 332 and the sum channel summation apparatus 350. After receiving the signals $I_i$ and $Q_i$, the azimuth angular error $dira_i$ (relative to the sum channel) and the azimuth angular error adjusting coefficient $a_i$, the $\alpha$ out of phase processing and scaling apparatus 330 outputs signals $I\alpha_i$ and $Q\alpha_i$. The signals $I\alpha_i$ and $Q\alpha_i$ for each index of i (i=1–N) are then input to the a channel summation apparatus 352 to sum up for generating signals $I\alpha$ and $Q\alpha$. Similarly, after receiving the signals $I_i$ and $Q_i$, the elevation angular error $dirb_i$, (relative to the sum channel) and the elevation angular error adjusting coefficient $\beta_i$, the $\beta$ out of phase processing and scaling apparatus 332 outputs signals $I\beta_i$ and $Q\beta_i$. The signals $I\beta_i$ and $Q\beta_i$ for each index of i (i=1–N) are then input to the $\beta$ channel summation apparatus 352 to sum up for generating signals $I\beta$ and $Q\beta$. The sum channel summation apparatus 350 then sums up the signals $I_i$ and $Q_i$ for each index i (i=1–N) to generate the signals $I_{sum\_}$ and $Q_{sum}$.

The respective output signals (Isum, $Q_{sum}$), ($I\alpha$, $Q\alpha$) and ($I\beta$, $Q\beta$) of the sum channel summation apparatus 350, the $\alpha$ channel summation apparatus 352, the $\beta$ channel summation apparatus 354 are not only directly output as signals (sum_i, sum_q), (alpha_i, alpha_q) and (beta_i, beta_q), but are also transmitted to the analog signal transformers 360/362/364. The above signals (sum_i, sum_q), (alpha_i, alpha_q) and (beta_i, beta_q) are transmitted to the signal processor 240 for simulation test of digital part.

In addition, the pre-pulse generator 340 generates a pre-pulse to each of the analog signal transformers 360/362/364 to set the phase of thereof to a certain value before generating the multiple simulated targets and the scenario signal for correction. The analog signal transformer 360/362/364 transforms each input signal to analog RF signals sum(t), alpha(t), beta(t). By injecting these signal to the direction couple 226 on the receiver, we can get the simulated RADAR return waveform on the receiver side.

Simulation targets are synthesized by the DMWG 314 using the baseband waveform and its Doppler frequency caused by the radial speed. Then the extent target generator 316 can expand the target to occupy multiple range cells. The digital modulation waveform generator 314 can process the waveform signal by (1) frequency modulation, LFM or V-LFM; and (2) phase modulation (PM) and pseudo random code modulation (where the pseudo random code is provided by the pseudo random code generator).

That is, the pseudo random code generator 312, the digital modulation waveform generator 314 and the extent target generator 316 constitue the digital part of the multiple simulated target generator. The timing control of such digital circuit is achieved by controlling the position where each simulated target appears by the precision timing generator 320, that is, the timing $t_i$ when the simulated target signal is generated. The required target signal can be generated at any time between the radiation initial point $T_0$ and the pulse repeat interval (PRI). The above hardware circuit can be implemented by FPGA or ASIC.

The assembly of single PRN code generator 312, digital modulation waveform generator 314 and extent target generator 316 can generate a simulated target signal of which pulse wave cannot be superposed within the same beam lobe. In modem radar technique, it is common to use pulse compression technique to achieve the long distance measurement. Therefore it needs longer pulse width to obtain larger return energy and maintain the range resolution by using pulse compression t Thus, either the LFM or PRN code method is used for modulating the long pulse. The relative minimum distance is limited if the return waveform cannot be superposed as required and the real target scenario cannot be simulated. To resolve this problem, multiple sets (i=1, 2, 3, . . . , k) of simulated targets generators are used to generate superposition of waveforms, and a digital accumulation sums up the simulated return waveform. The above summation blocks 350/352/354 are used to sum up the digital waveforms.

The individual set of simulated target generator uses the parameter transformation of the parameter memory in the internal circuit of the digital modulation waveform generator 314 to generate n simulated target signals, of which the magnitude, speed and orientation are independent, and the pulse wave thereof cannot be superposed. The system integrates k simulated target generators, that is, generates N=n*k simulated target signals with independent amplitude, speed, position, orientation and magnitude. Applying the characteristics of the generators that allows simulated feedback pulse signals to re-approach and configured to an extent target (or domain target), the effective radar cross section (RCS) value can be generated by various clutter mathematical formula according to the clutter characteristics. Some simulated targets can be configured as clutter effective feedback signals for radar clutter scenario simulation.

In addition, if some sets of simulated target generator in the same radar dwell are configured into different patterns of waveform modulations, for example, the PRN code sequence with different PC, PF parameters, or the IFM or V-LFM modulation with different frequency slope and bandwidth, these patterns of simulated targets with different waveform modulation can be used as the jammer source in system inspection.

According to the formula of the sum channel, α channel and β channel, the signal of the sum channel is adjusted to generate the signals (α,β) of the difference channels. The digital signals generated by these three channels can be separately connected to the digital part of the signal processor 240 for testing, or the frequency of which can be increased by the analog module to generate a RF signal. The RF signal is then transmitted to the receiving terminal of the signal processor 240 via the coupler 226 to simulate the return waveform of the radar.

Figure 4:
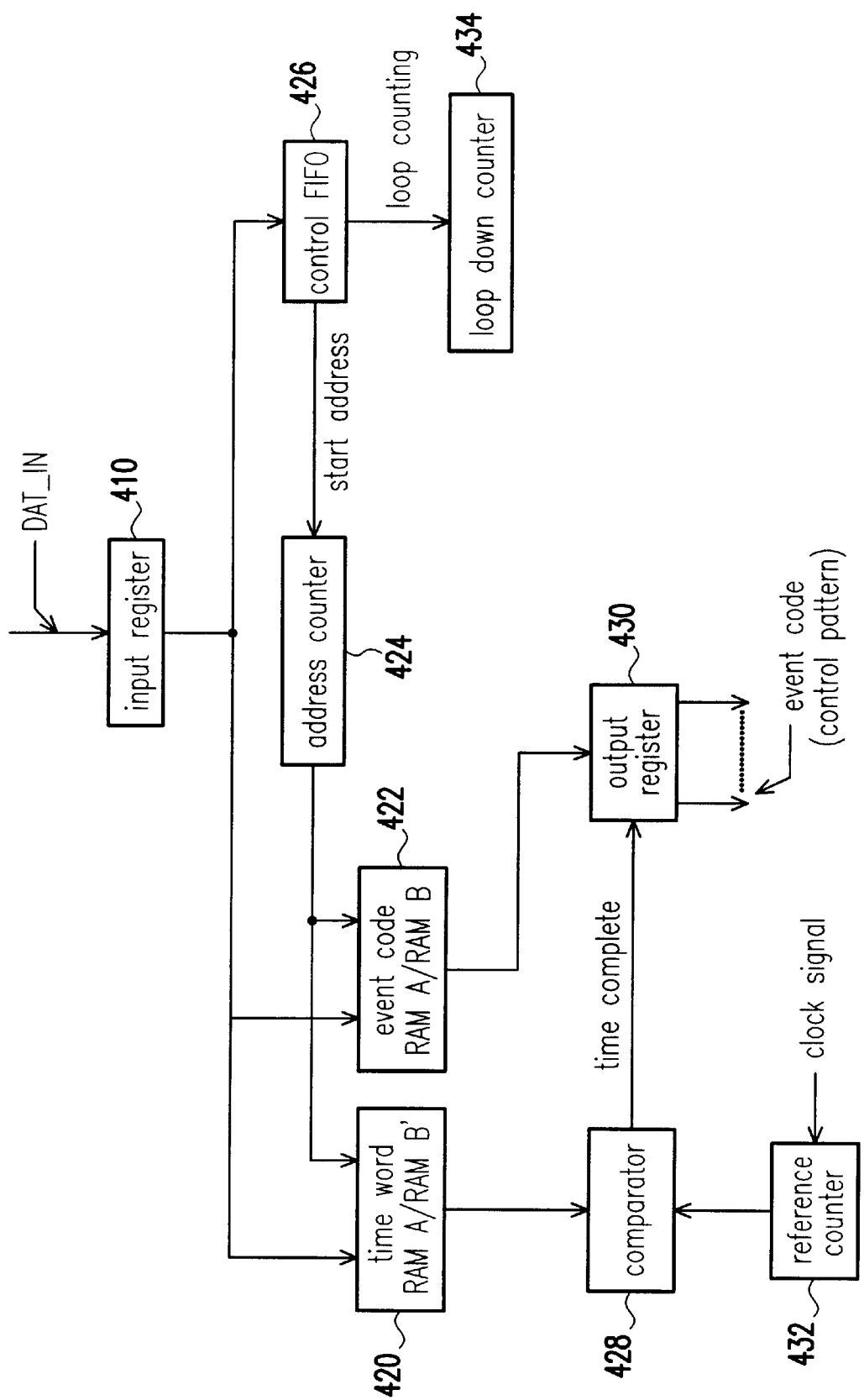
FIG. 4 shows a circuit block diagram of the precision timing generator.

The circuit structure and operation of the precision timing generator is described as follows. FIG. 4 illustrates the circuit block diagram of the precision timing generator. The precision timing generator comprises an input register 410, a time word RAM 420, an event code RAM 422, an address counter 424, a control FIFO 426, a loop down counter 434, a comparator 428, a reference counter 432 and an output register 430.

The input register 410 receives and temporarily stores an input data DAT_IN. The input register 410 is coupled to the control FIFO 426, the time word RAM 420, and the event code RAM 422. The control FIFO 426 outputs a start address and a loop count to the address counter 424 and the loop down counter 434, respectively. The address counter 424 searches the time word and event code in corresponding address from the time word RAM 420 and the event code RAM 422 according to the start address. The loop down counter 434 starts counting down according to the loop count. The comparator 428 reads the time word from the time word RAM 420 and a value of the reference counter 432 to compare, and then outputs a time complete signal when they are equal. The event code stored in the event code RAM 422 is output to the output register 430 for temporary storage. While receiving the time complete signal, the output register 430 outputs the event code (control waveform). The following describes the operation of the precision timing generator.

The precision timing generator 320 is used to control the position where each simulated target appears, that is, the timing $t_i$ to generate each simulated target. This design allows the simulated target to appear at each timing point from $T_0$ to PRI, that is, the position where the simulated targets is not limited. The above $T_0$ is the zero point for the radar pulse emission, PRI is the pulse repeat interval, and PW is the pulse width.

The precision timing generator 320 is programmable and recyclable. The structure thereof uses the parameters of time word, event code, start address and loop count to configure generation of the timing control signal.

The time word represents the time axis, and the event code represents the individual signal event variation. The hardware operation employs the event driven design to save the memory capacity requirement of the time word/event code RAM.

The start address indicates the time period between each $T_0$ and PRI, and corresponds to the start address of the time word and event code stored in the RAM's 420, 422. For multiple PRI dwells, if the timing sequence generated in the PRI is identical, the loop count can be used to configure the timing cycle count.

There are two sets of time word and event code RAM (RAM A/RAM B) in the precision timing generator 320. When the sequence data in one set of the RAM's is processed, the data to be processed next can be stored in the other RAM simultaneously to save the configuration time and to achieve the dwell pipeline model.

The precision timing generator 320 receives a real time clock (RTC) activation of the radar system to obtain the synchronization with the radar wave radiation. Typically, the activation timing of the precision timing generator 320 is $D_0$–t us. $D_o$ is the start timing for the dwell, t us is the prepositive time reserved by the system for precision timing generator 320 to start operating, so it can radiate the first modulation pulse wave at $D_0$.

Figure 5:
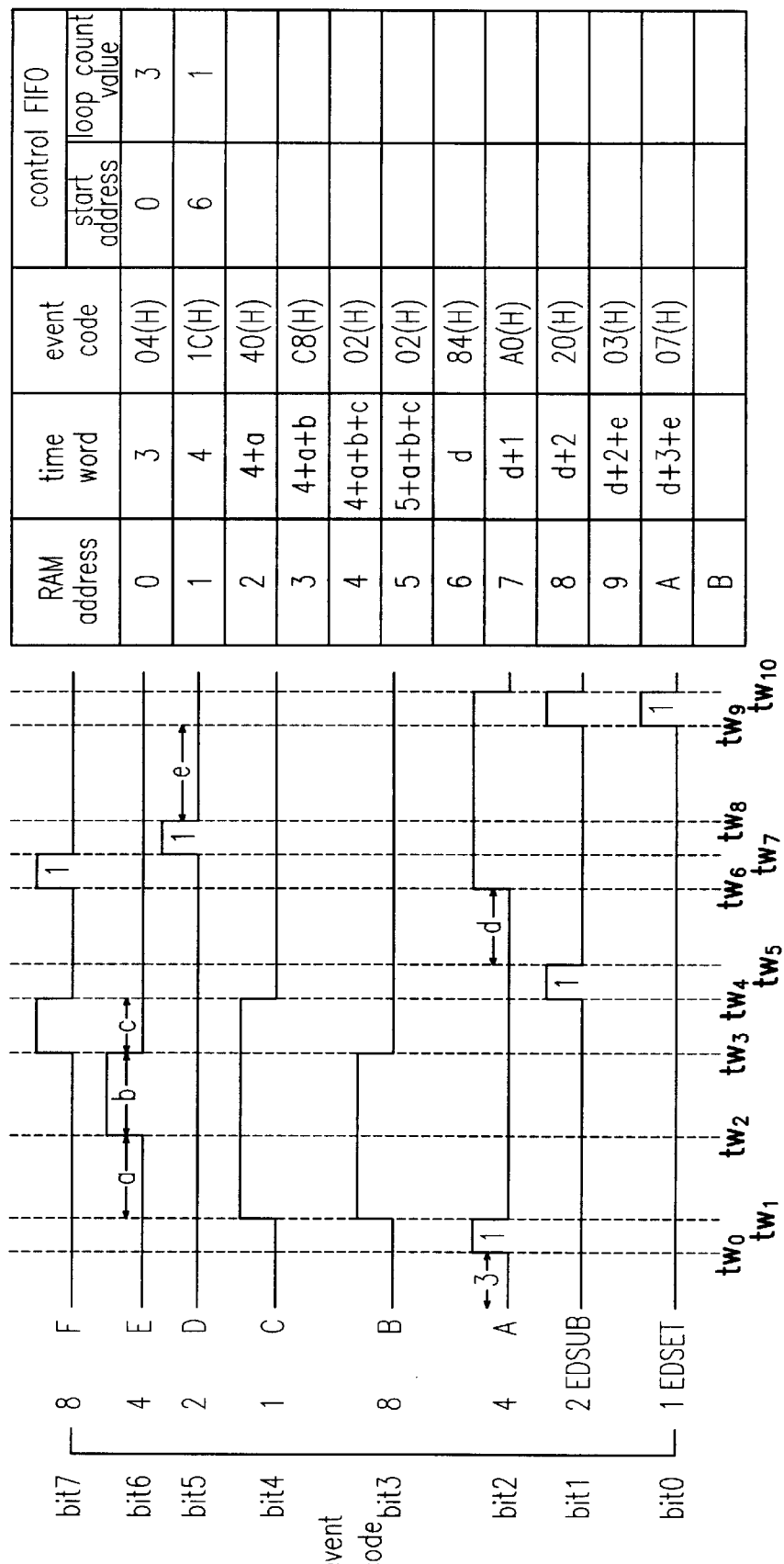
FIG. 5 shows timing control signal to be generated by the precision timing generator, and an example of the corresponding time word, event code, start address and loop counting value.

FIG. 5 shows the timing control signal to be generated by the precision timing generator, and the corresponding time word, event code, start address and loop count. The count value of the reference counter 432 is compared to the word time. If the count value of the reference counter 432 count to the same value as the time word, the comparator 428 outputs the time complete signal. The time complete signal triggers the output register 430 to output the value of the event code. Meanwhile, if the value of the event code is "1", the output of the output register 430 performs a state toggle. That is, the value of "1" will change to "0" and the value of "0" will change to "1". If the value of the event code is "0", the output of the output register 430 remains unchanged. The event code determines the pattern code of the output, while the time word controls the timing for outputting the pattern code.

Since the output of the event code occurs only when the count value of the reference counter is the same as the word count instead of being dependent on the count itself, this process is called event driven. As shown in FIG. 5, the loop count is 3 for the first timing segment (time word from $tw_0$ to $tw_5$), it indicates that the timing control signal is generated will repeat three times.

Figure 6:
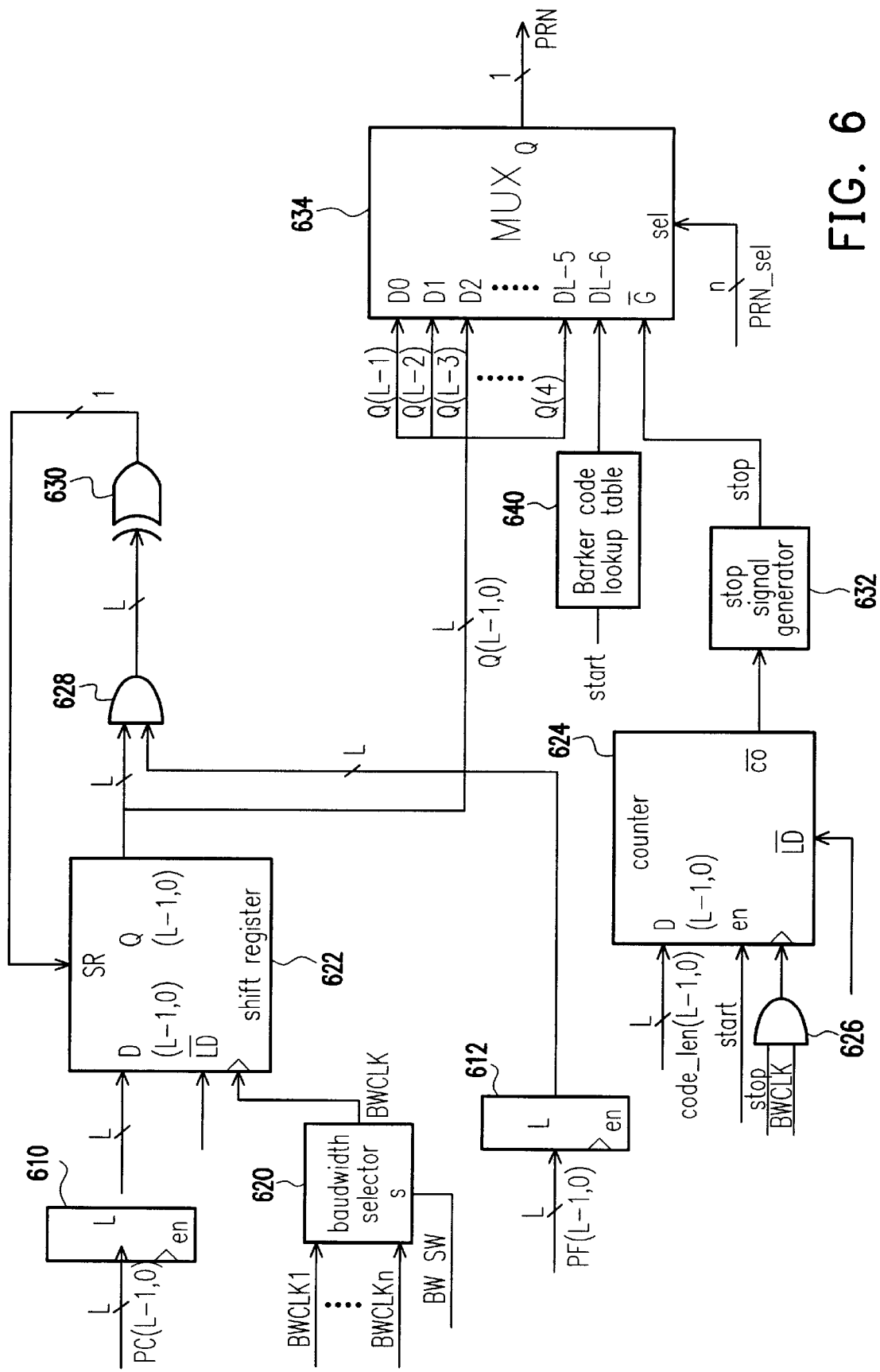
FIG. 6 shows the circuit functional block diagram of the pseudo random noise code generator.

FIG. 3 shows the circuit structure and operation of the pseudo random noise code generator 312. FIG. 6 shows the circuit function block diagram of the pseudo random noise code generator 312.

In FIG. 6, the pseudo random noise code generator 312 comprises registers 610, 612, a bandwidth selector 620, a shift register 622, a counter 624, a stop signal generator 632, a multiplxer 634, a barker code lookup table 640 and logic gates 626, 628, 630. As shown in FIG. 6, the PC (phase seed word) parameter (for example, L bit, PC(L−1, 0)) is input to the shift register 622 through the register 610. The PF (phase feed backward) parameter (for example, L bit, PF(L−1, 0) is input to the AND gate 628 through the register 612. The bandwidth selector 620 receives a plurality of bandwidth pulse signals BWCLK1, BWCLK2, . . . , BWCLKn and selects one of them as the bandwidth pulse signal BWCLK to transmitt to the shift register 622.

The output signal Q(L−1, 0) of shift register 622 is transmitted to the AND gate 628 and the input terminal of the multiplexer 634. The outputs of the shift register 622 and the register received by the AND gate 628 is calculated and then transmitted to the NOR gate 630. The output of the XOR gate 630 is then fed back to the input terminal SR of the shift register 622. Having received the modulation code length signal code_len(L−1,0), the start signal "start" and the output of the AND gate 626, the counter 624 outputs the counting results to the stop signal generator 632. When the counter 624 counts to a predetermined value, the stop signal generator 632 outputs a stop signal "stop" to the multiplexer 634 to stop the output of the multiplexer 634. Before receiving the signal stop, the multiplexer 634 continues outputting PRN sequence "PRN".

The operation of the PRN code generator 312 is introduced as follows. The PRN code generator 312 uses the shift register 622 to generate the PRN code sequence according to the parameters PC and PF. The PC parameter controls the initial phase, while the parameter PF controls the order of the sequence. Assuming that parameter PC has L bits, a code sequence generated with a period of $2^L-1$ is called the maximum length sequence "max-length sequence", or "m-sequence". The m-sequence has the characteristics of the PRN code sequence, which has the auto-correlated characteristics. Thus, PRN code has the functions of anti-interference and noise, and the Doppler sensitivity. In other words, PRN code sequence is easily destroyed by the Doppler sequence phase shift. Generally speaking, the Doppler compensation is performed before pulse compression to reduce the mismatched loss.

FIG. 6 shows the designs of applying different bandwidths to comply the requirements of different distance resolution for dwell searching and tracking by a radar system.

The pseudo random noise code length is determined by a multiplication of the bandwidth (BW) and a pulse width (PW) of the system. Such length code determines the output of the pseudo random noise code via the multiplexer 634. When the code length is smaller than 16, the barker code (with a maximum code length of 13) sequence is used for modulation, thereby, an optimal side lobe is obtained after pulse compression process.

The above barker code sequence can be obtained from a lookup table, by installing a barker code lookup table apparatus 640 connected to the input terminal DL-6 of the multiplexer 634.

When the pattern uses LFM or V-LFM for modulation, the PRN code generator is turned off. That is, the output of the PRN code sequence will always be zero. When the radar is operated under the simulated target mode, the PRN code sequence is modulated in the digital baseband frequency signal processing stage to allows the modulation of the PRN code sequence during the superposition of each simulated target signal. However, in the radiation tactical mode operation, only one digital modulation waveform generator generates the base signal of radiation, while other digital modulation waveform generators are turned off. Meanwhile, the PRN code modulation is performed in analog signal after the last level of the intermediate frequency increase to avoid affecting the signal fidelity caused by phase distortion of devices such like mixers.

Figure 7:
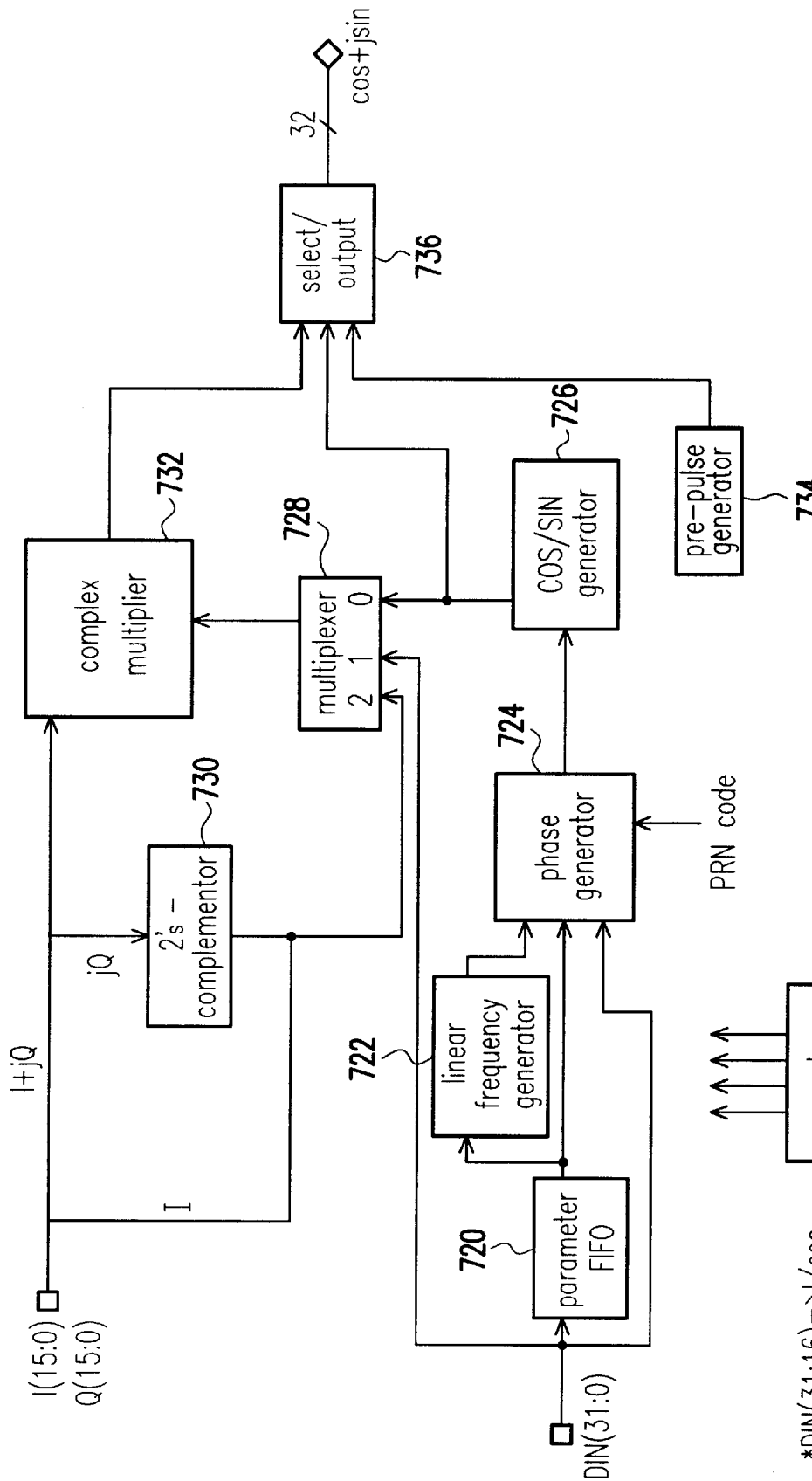
FIG. 7 shows circuit functional block diagram of the digital modulation waveform generator.

FIG. 3 shows the circuit structure and operation of the digital modulation waveform generator 314. FIG. 7 shows the circuit function blocks of the digital modulation waveform generator 314.

As shown in FIG. 7, the digital modulation waveform generator 314 comprises a parameter FIFO 720, a linear frequency generator 722, a phase generator 724, a 2's-complementor 730, a multiplexer 728, a COS/SIN generator 726, a pre-pulse generator 734, a complex multiplier 732, a selector/output apparatus 736, and a mode controller.

The above parameter FIFO 720 is used to store parameters including a frequency slope K1R, a start frequency (including the simulated target Doppler frequency) K2R, an a start phase K3R. When the modulation pattern signal is generated, the corresponding parameter memory starts downloading to provide the digital modulation waveform generator 314 generating pulse signals of multiple simulated target signals which cannot be superposed (whose position is limited for being separated with a space larger than PW*C/2), while the speed and magnitude thereof can be independently configured. The above parameters K1R, K2R and K3R can be presented by the following formula:

$$K1R = \frac{BW}{PWf_c^2}2^{N2}$$

$$K2R = \frac{f_0 + f_d}{f_c}2^{N2}$$

-continued $$K3R = \frac{\theta}{2\pi}2^n$$

where N is the hardware bit number of the frequency integrator, $N^2$ is the hardware bit number of the phase integrator, $f_c$ is the clock rate of the integrator, and $f_d$ is the Doppler frequency of the simulated target.

In addition, the above linear frequency generator 722 is a digital integrator that integrates the frequency slope into a frequency signal. In the structure viewpoint, the linear frequency generator 722 can generate the frequency integration of upward frequency slope and downward frequency slope separately, and a hybrid V-type frequency integration for the upward frequency slope and downward frequency slope. When the system selects the PRN code sequence modulation waveform, the parameter K1R is configured as 0.

The phase generator 724 also has a digital integrator structure. The frequency signal transmitted from the linear frequency generator 722 is firstly added with the start frequency given by the K2R parameter by an adder, and then integrated as the phase signal by the integrator. Further, the phase signal is added with a start phase given by the K3R by the adder to obtain the phase of the modulation signal. When the system selects PRN code sequence modulation waveform, the signal phase is modulated according to PRN code sequence. If PRN code is 1, the signal phase is added with 180°. If PRN code is 0, the signal phase is added with 0°, that is, the phase is remained unchanged.

The SIN/COS value generator 726 includes a lookup table. The sine and cosine values corresponding to the phase signal transmitted from the phase generator 724 are obtained. Basically, the higher the phase resolution is, the better the purity of the frequency is. However, there are more gate counts are required. To reduce the gate counts of the lookup table,. a ⅛ quadrant SIN/COS lookup table is designed to reduce the logic counts to about ⅛ of the original value. A $[0,\pi/4]$ lookup table can be assembled by a rough ROM and a fine ROM to further reduce the logic counts.

In FIG. 7, because the chip of digital modulation waveform generator has the mode operation selections among LFM, Direct FM, phase modulation, amplitude modulation, Doppler compensation, complex multiplier, square rule, pre-pulse signal, a block diagram of a mode controller 710 is included.

In this application of simulated target generator, the complex multiplier 732 is used to control the amplitude of the simulated target, of which the magnitude is provided by the parameter Ai.

Figure 8:
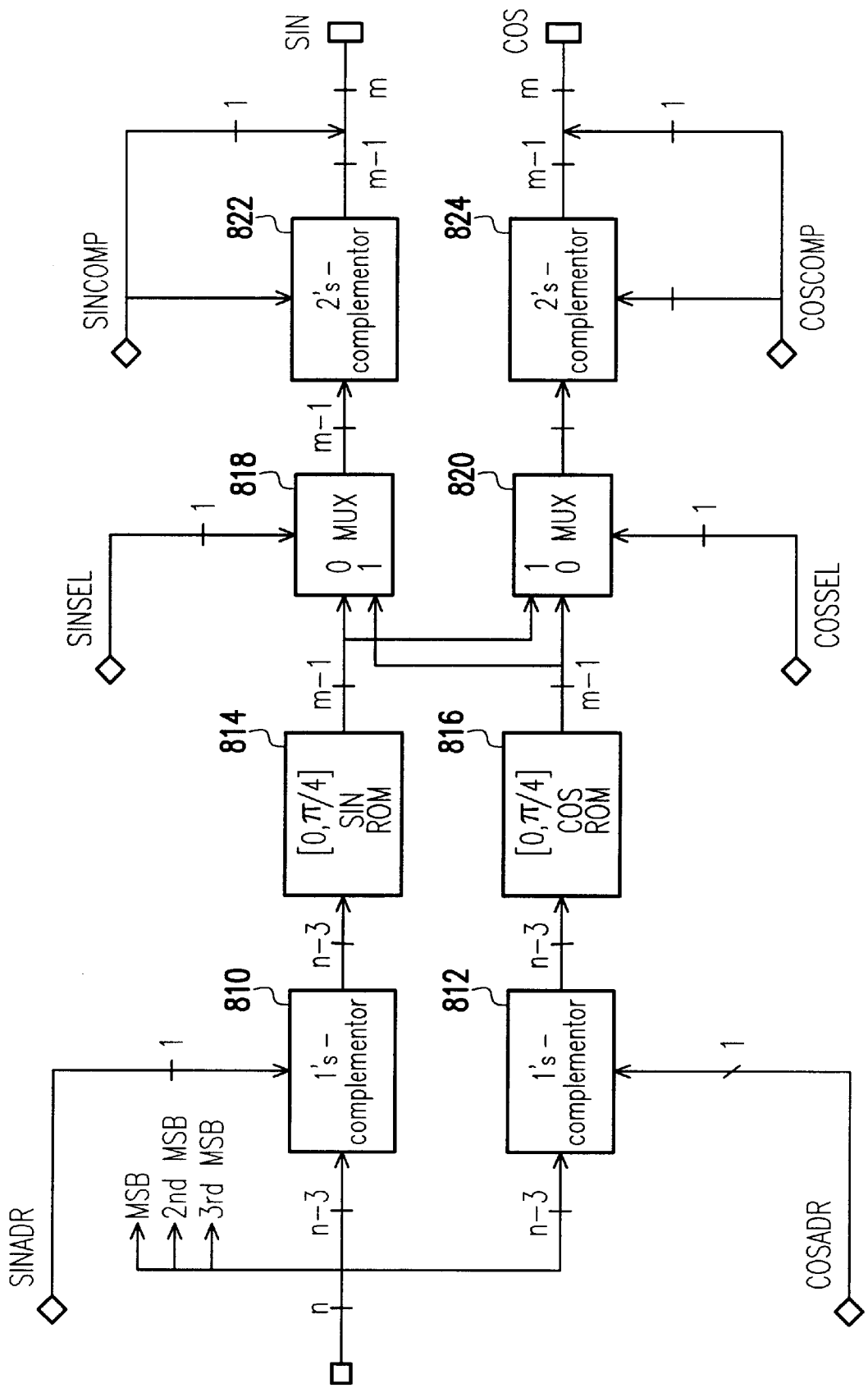
FIG. 8 shows the block diagram of the SIN/COS lookup apparatus of the digital modulation waveform generator.

FIG. 8 shows an example of the SIN/COS lookup table in the digital modulation waveform generator. The SIN/COS lookup table is composed of 1's-complementors 810, 812, a SIN ROM 814 and a COS ROM 816, multiplexers 818, 820 and 2's-complementors 822, 824 whereby output the sine and cosine values. The SIN/COS lookup table can be implemented in different methods. FIG. 8 only shows one example therefore, for one skill in the art can make the modification without exceeding the scope or spirit of the invention.

Figure 9:
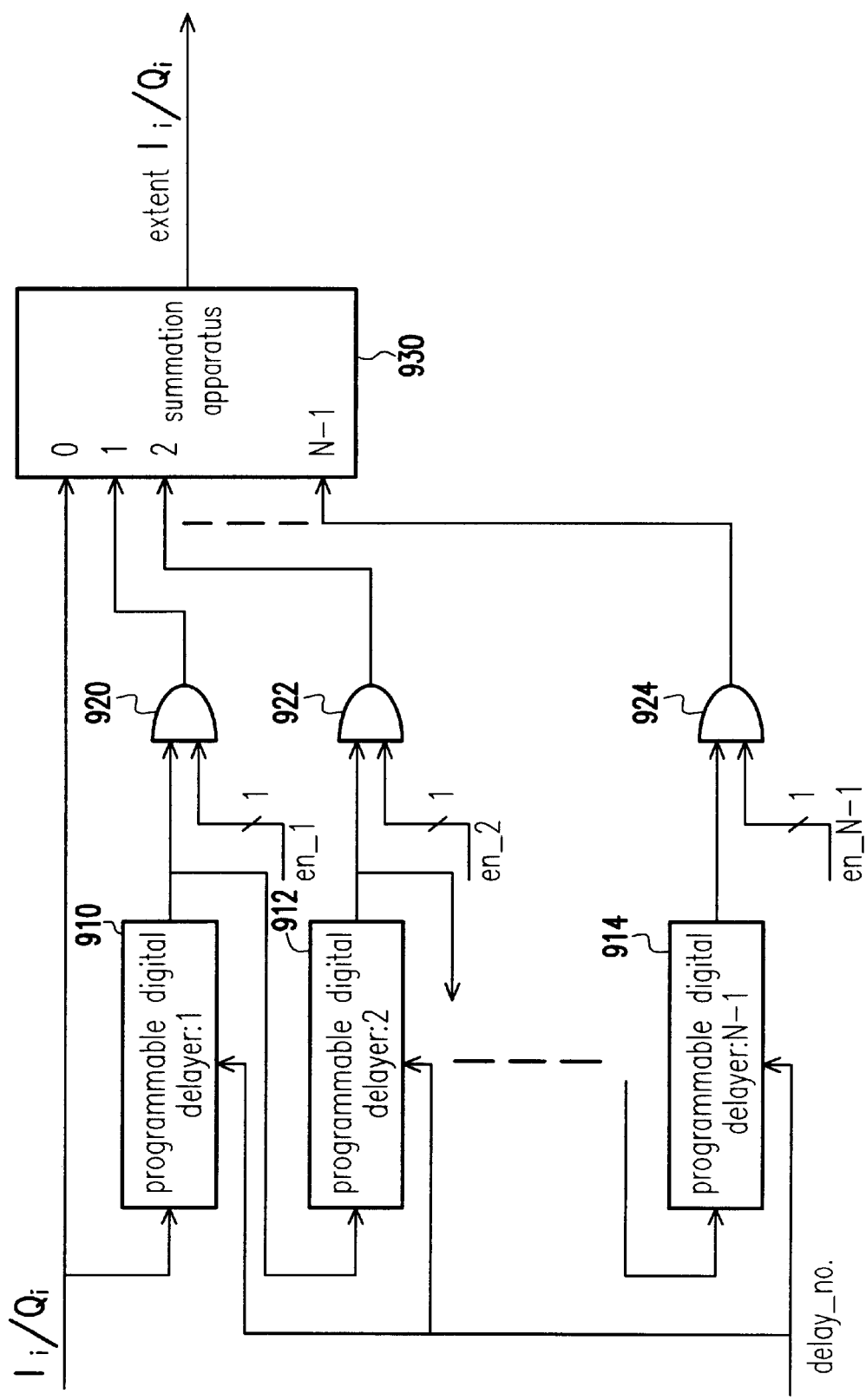
FIG. 9 shows the block diagram of the extent target generator.

The extent target generator 316 in FIG. 3 is described as follows. FIG. 9 shows the circuit functional diagram of the extent target generator.

In FIG. 9, the extent target generator 316 includes multiple programmable digital delayers 910, 912, 914, a plurality of AND gates 920, 922, 924, and a summation apparatus 930. The output signal $I_p/Q_i$ is transmitted to the programmable digital delayers 910 of the extent target generator 316. According to the input delay signal delay__no, the programmable digital delayer 910 determines the delay time, which is then output to the AND gate 920 and the next programmable digital delayer 912. In the extent target generator 316, the output of each programmable digital delayer is transmitted to a corresponding AND gate and the input of the next programmable digital delayer. The output signal $I_p/Q_i$ of the digital modulation waveform generator 314 and the output of all the AND gates 920, 922, 924 are all input to the summation apparatus 930, which then sum up all the input signals to output the related signal of the extent target.

When the dimension of the simulated target is larger than the range cell resolution, the target is called the extent target. To comply with various bandwidth requirements for the search and track mode, the delay time of the digital delayers 910, 912, 914, the delay time is programmable. The structure that configures the extentsimulated target and allows superposition of the simulated target pulses can be used to present the scenario of the simulated target located at surface clutter. To save the gate count of the digital delayer, a dual RAM switching structure can be applied to the circuit to avoid using latch structure.

Figure 10:
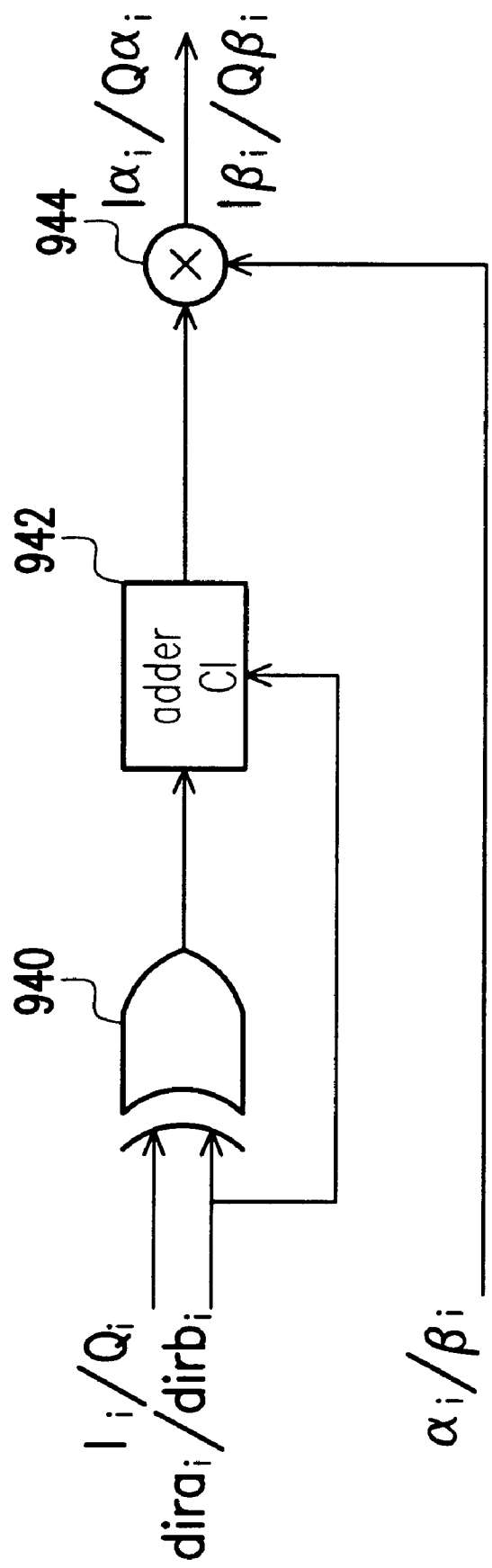
FIG. 10 shows the schematic drawing of the difference channel processing circuit.

FIG. 10 shows the circuit of the error channel process.

In the above formula of $\alpha(t)$ and $\beta(t)$, $\mathrm{dira}_i$, and $\mathrm{dirb}_i$, represent the azimuth and elevation angular error respectively. The angular error is either 0 or 1. When the angular error is 1, $\cos(\pi+\theta)=-\sin\theta$ and $\sin(\pi+\theta)=-\sin\theta$. Using such relation, the sum channel can be used as a reference signal and accompanied with the parameter configuration to generate the signal of angular error channel. While processing such angular error signal, the processor uses the channel signal of the sum channel for normalization. The normalized value is then divided by the slope of the beam lobe to obtain the angular error.

Figure 11:
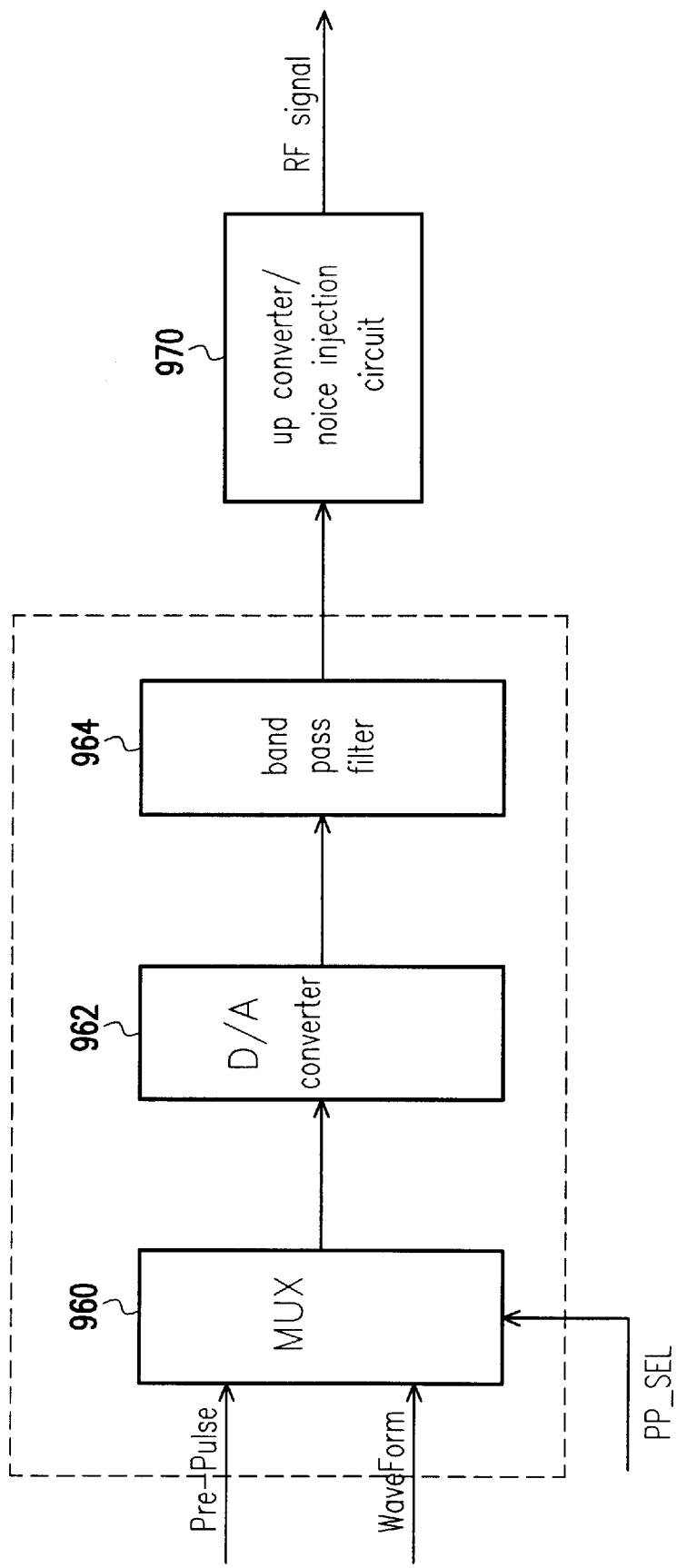
FIG. 11 shows a functional block diagram of the analog signal converter.

FIG. 11 illustrates the functional block diagram of the analog signal transformer.

As shown in FIG. 11, the analog signal transformer comprises a multiplexer 960, a D/A converter 962 and a band-pass filter 964. . Using multiplexier 960, we can choose pre-pulse or the waveform signal to input the D/A converter. Then the D/A converter 962 will transform the digital signal into analog signal. The band-pass pass filter 964 filters out the low frequency of the analog signal, and the filtered analog signal is then input to the up converter/noise injection circuit 970 to be converted into a RF signal and emitted to the predetermined space domain.

The multiple simulated target and scenario signals generated by the above digital circuit include inphase portion I and quadphase portion Q. Which are directly transmitted to the digital signal processor 246 of the signal processor 240. The analog signal transforming devices 360/362/364 converts the digital signal of the inphase portion I of the simulated target and scenario signals generated by the digital circuit into analog signals. The D/A converter and the band-pass filter are used for such signal process. Since the receiver/IFP 242 of the signal processor 242 includes an I/Q detector, so that only the inphase portion (I) is converted into analog signal without affecting the final detection of the sign digit of the Doppler frequency of the simulated target.

The signal of the pre-pulse generator 340 (FIG. 3) is used before generation of the multiple simulated targets and the scenarios. The phases of the DA converter 360/362/364 are controlled to a constant value for correction.

Appropriate noise energy is injected into the analog signal of the real time target generator via other subsequent analog circuit to modulate and control the signal/noise ratio of the simulated target signal. Via analog circuit of other up converter, the signal is up-converted to the required RF frequency range.

According to the above, the real time multiple simulated targets generator for mono pulse of the invention has the following features.

The multiple simulated target generators are built in the signal processor to resolve the interfacing problems of requiring synchronous control in the external radar environment simulated system case. The hardware cannot only generate multiple simulated targets and scenarios, but also can generate radiation pulse in tactical mode. The feature of hardware sharing reduces the system hardware development cost.

The required parameters for scenarios and simulated targets of the multiple simulated targets generators of the invention is configured by software of the radar controlled computer. So it is very flexible to use. In addition to provide comparison and verifications of various signal processes and target tracking processing algorithms in the system research and development stage, it also provides the system performance test, system diagnostic test, and the radar operator training when it is used.

The multiple simulated targets generator provides different pulse waveform modulation, such as the pseudo random nose code modulation, the linear frequency modulation (LFM), and V-type linear frequency modulation (V-LFM, nonlinear FM) for generating simulated target signals.

The multiple simulated targets generator allows generation of point target signal and extent simulated target, and can configure the size of the extent simulated target according to the parameters.

The hardware structure of the multiple simulated targets generator of the present invention allows the simulated targets in the same radar dwell to configure various types of pattern modulations (such as PRN code sequence of various PC, PF, or LFM, V-LFM with various frequency slop, bandwidth). The simulated targets in various types of waveform modulations can be used as jammer simulation in the system verification.

The multiple simulated targets generator allows the simulated target pulse signals to be superposed, and the amplitude, speed, position, orientation, and magnitude of each simulated target can be configured independently. Some of the equivalent radar cross section generated by mathematical models of different clutters according to the characteristics thereof can be configured as the equivalent feedback signal of the clutters for scenario simulation.

The multiple simulated targets generator uses digital timing control technique to have the simulated targets appear at any distance, without the blind distance region that limits the appearing position of the simulated targets.

The multiple simulated targets generator uses the signal of the sum channel as the reference signal to generate the difference channel of mono pulse radar instead of using the independent circuit. . We can generate the simulated difference channel by controlling the direction and magnitude of the off axis of beam. Lots of circuit design will be save.

The multiple simulated targets generator can be applied to test the whole system or digital circuit portion, It is suitable for test in all stages of research and development to isolate the problem.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A real time multiple simulated targets generator for mono pulse, applied to a simulation control system, wherein the simulation control system comprises at least a signal processor, the real time multiple simulated targets generator for mono pulse comprising:
   a real time multiple simulated targets generator built in the signal processor, further comprising:
      a precision timing generator, to generate a timing signal;
         N (N is an integer larger than or equal to 1) pseudo random noise code generators, each of which is coupled to the precision timing generator to receive the timing signal and to generate a pseudo random noise code thereby;
      N digital modulation waveform generators, each of which is coupled to the precision timing generator to receive the timing signal and is further coupled to the corresponding pseudo random noise code generator to receive the pseudo random noise code, and to generate a modulation waveform signal thereby; and
      N extent target generators, each of which is coupled to the corresponding digital modulation waveform generator to receive the modulation waveform signal, so as to generate a simulated target signal.

2. The real time multiple simulated targets generator for mono pulse according to claim 1, further comprising a sum channel summation apparatus coupled to an output of each extent target generator to sum up the outputs of all the extent target generators, so as to generate a sum channel signal.

3. The real time multiple simulated targets generator for mono pulse according to claim 1, further comprising:
   an α channel difference process and scale, coupled to the output of each extent target generator;
   an α channel summation apparatus, coupled to the α channel difference process and scale obtain a summation of an outputs of the α channel difference process and scale, so as to generate an α channel signal;
   a β channel difference process and scale, coupled to the output of each extent target generator; and
   a β channel summation apparatus, coupled to the β channel difference process and scale obtain a summation of an outputs of the β channel difference process and scale, so as to generate a β channel signal.

4. The real time multiple simulated targets generator for mono pulse according to claim 3, further comprising a plurality of analog signal transformers, coupled to the sum channel summation apparatus, the α channel summation apparatus, and the β channel summation apparatus.

5. The real time multiple simulated targets generator for mono pulse according to claim 4, further comprising a pre-pulse generator coupled to each of the analog signal transformer to provide a pre-pulse signal.

6. The real time multiple simulated targets generator for mono pulse according to claim 1, wherein the precision timing generator comprises:
   an input register, to receive an external data;
   a time word RAM, coupled to the input register to store a plurality of time words;
   an event code RAM, coupled to the input register to store a plurality of event codes;
   a control FIFO, coupled to the input register to provide at least a start address and a loop count value;
   an address counter, coupled to the time word RAM, the event code RAM and the control FIFO to address the corresponding time word and event code of the start address;

a loop down counter, coupled to the control FIFO to count down the loop count value;

a reference counter, to provide a reference count value;

a comparator, coupled to the word time RAM and the reference counter to compare the reference count value with a time word value output by the time word RAM, wherein when the reference count value equal to the time word value, a time complete signal is output; and an output register, coupled to the event code RAM and the comparator, wherein the event code transmitted from the event code RAM is output while receiving the time complete signal.

7. The real time multiple simulated targets generator for mono pulse according to claim 1, wherein each pseudo random noise code generator comprises:

a first register, to receive a phase seed word parameter PC;

a second register, to receive a phase feedback word parameter PF;

a bandwidth selector, to receive a plurality of bandwidth pulses and to output a bandwidth pulse signal;

a shift register, coupled to the first register and the bandwidth selector to receive the parameter PC and the bandwidth pulse signal, and to generate a pseudo random noise code sequence;

a counter, to output a trigger signal according to a code length;

a stop signal generator, coupled to the counter to generate a stop signal according to the trigger signal;

a multiplexer, coupled to the shift register to sequentially output each bit of the pseudo random noise sequence code, and coupled to the stop signal generator, so that the multiplexer stops outputting while receiving the stop signal;

an AND gate, to receive the pseudo random noise code sequence and the PF parameter output by the shift register and the second register; and a NOR gate, coupled to an output of the AND gate, and to output a feedback to the first register.

8. The real time multiple simulated targets generator for mono pulse according to claim 7, wherein the pseudo random noise generators further comprises a Barker code lookup table coupled to an input of the multiplexer.

9. The real time multiple simulated targets generator for mono pulse according to claim 1, wherein each digital modulation waveform generator further comprises:

a parameter FIFO, to receive a parameter data;

a linear frequency generator, coupled to an output of the parameter FIFO to generate a linear frequency or a V-shaped frequency;

a phase generator, coupled to the parameter FIFO and the linear frequency generator to generate a phase according to the pseudo random noise code sequence;

a 2's-complementor;

a COS/SIN value generator, coupled to an output of the phase generator;

a multiplxer, to receive the data, an output of the 2-complementor and an output of the COS/SIN value generator;

a pre-pulse generator;

a complex multiplier, to receive an output of the multiplexer; and a select/output apparatus, to receive outputs of the pre-pulse generator, the complex multiplier and the COS/SIN value generator, and to output one thereof.

10. The real time multiple simulated targets generator for mono pulse according to claim 1, wherein each extent target generator comprises:

a plurality of programmable digital delayers serially connected with each other, an output of each programmable digital delayer is connected to an input of the next programmable digital delayer, wherein a first input of the programmable digital delayers is coupled to an output signal of the digital modulation waveform generator;

a plurality of AND gates, to receive the output signals of the programmable digital delayers; and a summation apparatus, coupled to an output of each AND gate and an output signal of the digital modulation waveform generator to sum up a summation, so as to generate the simulated target signal.

11. A real time multiple simulated targets generator for mono pulse, applied to a simulation control system, wherein the simulation control system comprises at least a signal processor, which further comprises a waveform generator, the real time multiple simulated targets generator for mono pulse comprising:

a real time multiple simulated targets generator built in the signal processor, further comprising:

a precision timing generator, to generate a timing signal;

N (N is an integer larger than or equal to 1) pseudo random noise code generators, each of which is coupled to the precision timing generator to receive the timing signal and to generate a pseudo random noise code thereby;

N digital modulation waveform generators, each of which is coupled to the precision timing generator to receive the timing signal and is further coupled to the corresponding pseudo random noise code generator to receive the pseudo random noise code, and to generate a modulation waveform signal thereby; and N extent target generators, each of which is coupled to the corresponding digital modulation waveform generator to receive the modulation waveform signal, so as to generate a simulated target signal.

12. The real time multiple simulated targets generator for mono pulse according to claim 11, further comprising a sum channel summation apparatus coupled to an output of each extent target generator to sum up the outputs of all the extent target generators, so as to generate a sum channel signal.

13. The real time multiple simulated targets generator for mono pulse according to claim 11, further comprising:

an α channel difference process and scale, coupled to the output of each extent target generator;

an α channel summation apparatus, coupled to the α channel difference process and scale obtain a summation of an outputs of the α channel difference process and scale, so as to generate an α channel signal;

a β channel difference process and scale, coupled to the output of each extent target generator; and a β channel summation apparatus, coupled to the β channel difference process and scale obtain a summation of an outputs of the β channel difference process and scale, so as to generate a β channel signal.

14. The real time multiple simulated targets generator for mono pulse according to claim 13, further comprising a plurality of analog signal transformers, coupled to the sum channel summation apparatus, the α channel summation apparatus, and the β channel summation apparatus.

15. The real time multiple simulated targets generator for mono pulse according to claim 14, further comprising a pre-pulse generator coupled to each of the analog signal transformer to provide a pre-pulse signal.

16. The real time multiple simulated targets generator for mono pulse according to claim 11, wherein the precision timing generator comprises:
   an input register, to receive an external data;
   a time word RAM, coupled to the input register to store a plurality of time words;
   an event code RAM, coupled to the input register to store a plurality of event codes;
   a control FIFO, coupled to the input register to provide at least a start address and a loop count value;
   an address counter, coupled to the time word RAM, the event code RAM and the control FIFO to address the corresponding time word and event code of the start address;
   a loop down counter, coupled to the control FIFO to count down the loop count value;
   a reference counter, to provide a reference count value;
   a comparator, coupled to the word time RAM and the reference counter to compare the reference count value with a time word value output by the time word RAM, wherein when the reference count value equal to the time word value, a time complete signal is output; and
   an output register, coupled to the event code RAM and the comparator, wherein the event code transmitted from the event code RAM is output while receiving the time complete signal.

17. The real time multiple simulated targets generator for mono pulse according o claim 11, wherein each pseudo random noise code generator comprises:
   a first register, to receive a phase seed word parameter PC;
   a second register, to receive a phase feedback word parameter PF;
   a bandwidth selector, to receive a plurality of bandwidth pulses and to output a bandwidth pulse signal;
   a shift register, coupled to the first register and the bandwidth selector to receive the parameter PC and the bandwidth pulse signal, and to generate a pseudo random noise code sequence;
   a counter, to output a trigger signal according to a code length;
   a stop signal generator, coupled to the counter to generate a stop signal according to the trigger signal;
   a multiplexer, coupled to the shift register to sequentially output each bit of the pseudo random noise sequence code, and coupled to the stop signal generator, so that the multiplexer stops outputting when it receives the stop signal;
   an AND gate, to receive the pseudo random noise code sequence and the PF parameter output by the shift register and the second register; and
   a NOR gate, coupled to an output of the AND gate, and a feedback to the first register.

18. The real time multiple simulated targets generator for mono pulse according to claim 17, wherein the pseudo random noise generators further comprises a Barker code lookup table coupled to an input of the multiplexer.

19. The real time multiple simulated targets generator for mono pulse according to claim 11, wherein each digital modulation waveform generator further comprises:
   a parameter FIFO, to receive a parameter data data signal;
   a linear frequency generator, coupled to an output of the parameter FIFO to generate a linear frequency or a V-shaped frequency;
   a phase generator, coupled to the parameter FIFO and the linear frequency generator to generate a phase according to the pseudo random noise code sequence;
   a 2's-complementor;
   a COS/SIN value generator, coupled to an output of the phase generator;
   a multiplxer, to receive the data, an output of the 2-complementor and an output of the COS/SIN value generator;
   a pre-pulse generator;
   a complex multiplier, to receive an output of the multiplexer; and
   a select/output apparatus, to receive outputs of the pre-pulse generator, the complex multiplier and the COS/SIN value generator, and to output one thereof.

20. The real time multiple simulated targets generator for mono pulse according to claim 11, wherein each extent target generator comprises:
   a plurality of programmable digital delayers serially connected with each other, an output of each programmable digital delayer is connected to an input of the next programmable digital delayer, wherein a first input of the progammable digital delayers is coupled to an output signal of the digital modulation waveform generator;
   a plurality of AND gates, to receive the output signals of the programmable digital delayers; and
   a summation apparatus, coupled to an output of each AND gate and an output signal of the digital modulation waveform generator to sum up a summation, so as to generate the simulated target signal.

21. A radar simulation control system with a real time multiple simulated targets generator, comprising at least:
   a radar control computer;
   a signal generator, coupled to the radar control computer, including a digital signal processor, a receiver/intermediate frequency processor, and a waveform generator connected to each other;
   a real time multiple simulated targets generator built in the signal processor, further comprising:
      a precision timing generator, to generate a timing signal;
      N (N is an integer larger than or equal to 1) pseudo random noise code generators, each of which is coupled to the precision timing generator to receive the timing signal and to generate a pseudo random noise code thereby;
      N digital modulation waveform generators, each of which is coupled to the precision timing generator to receive the timing signal and is further coupled to the corresponding pseudo random noise code generator to receive the pseudo random noise code, and to generate a modulation waveform signal thereby; and
      N extent target generators, each of which is coupled to the corresponding digital modulation waveform generator to receive the modulation waveform signal, so as to generate a simulated target signal.

22. The real time multiple simulated targets generator for mono pulse according to claim 21, further comprising a sum channel summation apparatus coupled to an output of each extent target generator to sum up the outputs of all the extent target generators, so as to generate a sum channel signal.

23. The real time multiple simulated targets generator for mono pulse according to claim 21, further comprising:

an α channel difference process and scale, coupled to the output of each extent target generator;

an α channel summation apparatus, coupled to the a channel difference process and scale obtain a summation of an outputs of the α channel difference process and scale, so as to generate an α channel signal;

a β channel difference process and scale, coupled to the output of each extent target generator; and a β channel summation apparatus, coupled to the β channel difference process and scale obtain a summation of an outputs of the β channel difference process and scale, so as to generate a β channel signal.

24. The real time multiple simulated targets generator for mono pulse according to claim 23, further comprising a plurality of analog signal transformers, coupled to the sum channel summation apparatus, the α channel summation apparatus, and the β channel summation apparatus.

25. The real time multiple simulated targets generator for mono pulse according to claim 24, further comprising a pre-pulse generator coupled to each of the analog signal transformer to provide a pre-pulse signal.

26. The real time multiple simulated targets generator for mono pulse according to claim 21, wherein the precision timing generator comprises:

an input register, to receive an external data;

a time word RAM, coupled to the input register to store a plurality of time words;

an event code RAM, coupled to the input register to store a plurality of event codes;

a control FIFO, coupled to the input register to provide at least a start address and a loop count value;

an address counter, coupled to the time word RAM, the event code RAM and the control FIFO to address the corresponding time word and event code of the start address;

a loop down counter, coupled to the control FIFO to count down the loop count value;

a reference counter, to provide a reference count value;

a comparator, coupled to the word time RAM and the reference counter to compare the reference count value with a time word value output by the time word RAM, wherein when the reference count value equal to the time word value, a time complete signal is output; and an output register, coupled to the event code RAM and the comparator, wherein the event code transmitted from the event code RAM is output while receiving the time complete signal.

27. The real time multiple simulated targets generator for mono pulse according to claim 21, wherein each pseudo random noise code generator comprises:

a first register, to receive a phase seed word parameter PC;

a second register, to receive a phase feedback word parameter PF;

a bandwidth selector, to receive a plurality of bandwidth pulses and to output a bandwidth pulse signal;

a shift register, coupled to the first register and the bandwidth selector to receive the parameter PC and the bandwidth pulse signal, and to generate a pseudo random noise code sequence;

a counter, to output a trigger signal according to a code length;

a stop signal generator, coupled to the counter to generate a stop signal according to the trigger signal;

a multiplexer, coupled to the shift register to sequentially output each bit of the pseudo random noise sequence code, and coupled to the stop signal generator, so that the multiplexer stops outputting while receiving the stop signal;

an AND gate, to receive the pseudo random noise code sequence and the PF parameter output by the shift register and the second register; and a NOR gate, coupled to an output of the AND gate, and to output a feedback to the first register.

28. The real time multiple simulated targets generator for mono pulse according to claim 27, wherein the pseudo random noise generators further comprises a Barker ode lookup table coupled to an input of the multiplexer.

29. The real time multiple simulated targets generator for mono pulse according to claim 21, wherein each digital modulation waveform generator further comprises:

a parameter FIFO, to receive a parameter data;

a linear frequency generator, coupled to an output of the parameter FIFO to generate a linear frequency or a V-shaped frequency; a phase generator, coupled to the parameter FIFO and the linear frequency generator to generate a phase according to the pseudo random noise code sequence;

a 2's-complementor;

a COS/SIN value generator, coupled to an output of the phase generator;

a multiplxer, to receive the data, an output of the 2-complementor and an output of the COS/SIN value generator;

a pre-pulse generator;

a complex multiplier, to receive an output of the multiplexer; and a select/output apparatus, to receive outputs of the pre-pulse generator, the complex multiplier and the COS/SIN value generator, and to output one thereof.

30. The real time multiple simulated targets generator for mono pulse according to claim 21, wherein each extent target generator comprises:

a plurality of programmable digital delayers serially connected with each other, an output of each programmable digital delayer is connected to an input of the next programmable digital delayer, wherein a first input of the progammable digital delayers is coupled to an output signal of the digital modulation waveform generator;

a plurality of AND gates, to receive the output signals of the programmable digital delayers; and a summation apparatus, coupled to an output of each AND gate and an output signal of the digital modulation waveform generator to sum up a summation, so as to generate the simulated target signal.

* * * * *